US012358011B2

(12) United States Patent
Wieschollek et al.

(10) Patent No.: US 12,358,011 B2
(45) Date of Patent: Jul. 15, 2025

(54) FUEL INJECTOR RETENTION ARRANGEMENT

(71) Applicant: Robert Bosch GmbH, Stuttgart (DE)

(72) Inventors: Sebastian Wieschollek, Ann Arbor, MI (US); Mohan Yelanadu Siddaiah, Bangalore (IN); John Seifert, Kalkaska, MI (US); Roberto Ivan del Angel Esparza Valerio, San Luis Potosi (MX)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 18/063,312

(22) Filed: Dec. 8, 2022

(65) Prior Publication Data

US 2024/0189853 A1 Jun. 13, 2024

(51) Int. Cl.
*F02M 35/10* (2006.01)
*B05B 1/20* (2006.01)
(Continued)

(52) U.S. Cl.
CPC .............. *B05B 15/658* (2018.02); *B05B 1/20* (2013.01); *F02M 35/10216* (2013.01); *F02M 37/0047* (2013.01); *F02M 69/465* (2013.01)

(58) Field of Classification Search
CPC .... B05B 15/658; B05B 1/20; F02M 21/0218; F02M 21/0245; F02M 35/10216;
(Continued)

(56) References Cited

U.S. PATENT DOCUMENTS 3,527,485 A * 9/1970 Goward ................ F16L 37/144 285/305
9,567,961 B2 2/2017 Cass et al.
(Continued)

FOREIGN PATENT DOCUMENTS

EP 3073023 6/2018
WO 2018007188 1/2018

*Primary Examiner* — Grant Moubry
*Assistant Examiner* — James G Moubry
(74) *Attorney, Agent, or Firm* — Maginot, Moore & Beck LLP

(57) ABSTRACT

A fuel injector retention arrangement for connecting a fuel injector with a fuel rail comprises a fuel injector receiving cup having a fuel rail end in connection with a fuel rail and a fuel injector insertion end into which a fuel injector is insertable and connecting pins, the connecting pins being insertable into the receiving cup in such a manner, that a longitudinal axis of the connecting pins is situated in a first plane, which is oriented perpendicularly to a longitudinal axis of the receiving cup. The connecting pins are arranged in apertures of the receiving cup. A longitudinal axis of the apertures and the longitudinal axis of the connecting pins are aligned with each other. The apertures have an insertion end into which the connecting pins are insertable and a shoulder forming an axial stop for the connecting pins at a second end of the apertures. The apertures have a service opening which is arranged between the shoulder of the apertures and an outside surface of the receiving cup. The service openings are defined by a first side surface radially extending away from the second end of the first aperture and the longitudinal axis of the apertures, a second side surface extending along the longitudinal axis of the first aperture and away from the first aperture, and a third side surface and a fourth side surface. The first side surface and second side surface extend between the third side surface and fourth side surface.

20 Claims, 3 Drawing Sheets

(51) Int. Cl.

| | |
|---|---|
| ***B05B 15/658*** | (2018.01) |
| ***F02M 37/00*** | (2006.01) |
| ***F02M 69/46*** | (2006.01) |

(58) Field of Classification Search

CPC .. F02M 37/0047; F02M 55/02; F02M 55/025; F02M 63/0225; F02M 63/0275; F02M 69/465; F02M 2200/856

See application file for complete search history.

(56) References Cited

U.S. PATENT DOCUMENTS

| | | | | |
|---|---|---|---|---|
| 9,797,355 | B2 | 10/2017 | Reinhardt et al. | |
| 9,816,472 | B2 | 11/2017 | Lang | |
| 9,957,938 | B2 * | 5/2018 | Roseborsky ......... | F02M 69/465 |
| 10,174,734 | B2 | 1/2019 | Reinhardt et al. | |
| 10,648,439 | B2 | 5/2020 | Pohlmann et al. | |
| 12,158,129 | B2 * | 12/2024 | Rehwald ................ | F02M 61/14 |
| 2016/0025053 | A1 | 1/2016 | Reinhardt et al. | |
| 2016/0076503 | A1 | 3/2016 | Fischer et al. | |
| 2016/0273501 | A1 * | 9/2016 | Cass .................... | F02M 61/168 |

* cited by examiner

FUEL INJECTOR RETENTION ARRANGEMENT

TECHNICAL FIELD

The present disclosure relates a fuel injector retention arrangement.

BACKGROUND

Known fuel injector retention arrangements for connecting fuel injectors with a fuel rail comprise fuel injector receiving cups for fuel injectors, wherein the receiving cups have connecting pins insertable into the receiving cups. The connecting pins are arranged in apertures defined by the receiving cups and are secured with retaining clips. The apertures have an insertion end into which the connecting pins are insertable. The apertures are stepped at the second end away from the insertion end. Such stepped bores are known from fuel injector retention arrangements in U.S. Pat. Nos. 9,816,472 and 9,567,961. Those fuel injector retention arrangements may utilize retaining clips that have a rectangular cross section with a thickness and a width, wherein the width extends along the length of the receiving cups and is bigger than the diameter of the connecting pins, therefore extending further along the length of the receiving cups than then connecting pins.

It is desirable to provide a fuel injector retention arrangement that provides a reliable connection, requires minimal space and which has few parts and is relatively simple to manufacture and install.

SUMMARY

One aspect of this disclosure is directed to a fuel injector retention arrangement for connecting a fuel injector with a fuel rail which comprises a fuel injector receiving cup having a fuel rail end in connection with a fuel rail and a fuel injector insertion end into which a fuel injector is insertable and at least a first connecting pin, the first connecting pin being insertable into the receiving cup in such a manner, that a longitudinal axis of the first connecting pin is situated substantially in a first plane, which is oriented perpendicularly to a longitudinal axis of the receiving cup. The first connecting pin is at least partially arranged in a first aperture defined by the receiving cup, wherein a longitudinal axis of the first aperture and the longitudinal axis of the first connecting pin are coaxial to each other. The first aperture has an insertion end into which the first connecting pin is insertable and a shoulder forming an axial stop for the first connecting pin at a second end of the first aperture away from the insertion end of the first aperture. The first aperture has a service opening which is arranged in the receiving cup between the shoulder of the first aperture and an outside surface of the receiving cup. The service opening of the first aperture is defined by a first side surface radially extending away from the second end of the first aperture and the longitudinal axis of the first aperture, a second side surface extending along the longitudinal axis of the first aperture and away from the first aperture, and a third side surface and a fourth side surface, wherein the first side surface and second side surface extend between the third side surface and fourth side surface.

In another aspect, the first side surface of the service opening of the first aperture is arranged at a right angle to the first plane and extends from the first aperture to the outside surface of the receiving cup.

In another aspect, the first side surface and the second side surface of the service opening of the first aperture are arranged at a right angle to each other.

In another aspect, the third side surface and the fourth side surface of the service opening of the first aperture are flat, parallel to each other and equidistant to the first plane.

In another aspect, the second side surface and the third side surface of the service opening of the first aperture define a rounded corner and the second side surface and the fourth side surface of the service opening of the first aperture define a rounded corner.

In another aspect, the fuel injector retention arrangement further comprises a second connecting pin, the second connecting pin being insertable into the receiving cup in such a manner, that a longitudinal axis of the second connecting pin is situated at substantially in the first plane. The second connecting pin is at least partially arranged in a second aperture defined by the receiving cup, wherein a longitudinal axis of the second aperture and the longitudinal axis of the second connecting pin are coaxial to each other. The second aperture has an insertion end into which the second connecting pin is insertable and a shoulder forming an axial stop for the second connecting pin at a second end of the second aperture away from the insertion end of the second aperture. The second aperture has a service opening which is arranged in the receiving cup between a shoulder of the second aperture and an outside surface of the receiving cup. The service opening of the second aperture is defined by: a first side surface radially extending away from the second aperture and the longitudinal axis of the second aperture, a second side surface extending along the longitudinal axis of the first aperture and away from the second aperture, a third side surface and a fourth side surface, wherein the first side surface and the second side surface extend between the third side surface and fourth side surface, and wherein the service opening of the first aperture and the service opening of the second aperture have the same distance to the longitudinal axis of the receiving cup.

In another aspect, the first side surface of the service opening of the second aperture is arranged at a right angle to the first plane and extends from the second aperture to the outside surface of the receiving cup.

In another aspect, the first side surface and the second side surface of the service opening of the second aperture are arranged at a right angle to each other.

In another aspect, the third side surface and the fourth side surface of the service opening of the second aperture are flat, parallel to each other and equidistant to the first plane.

In another aspect, the second side surface and the third side surface of the service opening of the second aperture define a rounded corner and the second side surface and the fourth side surface of the service opening of the second aperture define a rounded corner.

In another aspect, the longitudinal axis of the receiving cup defines a symmetry plane, wherein the first aperture and second aperture are symmetrically arranged to each other with respect to the symmetry plane, and wherein the service opening of the first aperture and the service opening of the second aperture are symmetrically arranged to each other with respect to the symmetry plane.

In another aspect, the first side surface of the service opening of the first aperture and the first side surface of the service opening of the second aperture define a service opening plane which is parallel to the longitudinal axis of the receiving cup and at a right angle to the first plane.

In another aspect, the receiving cup comprises a longitudinal groove which extends along the outside surface of the receiving cup and between the service opening of the first aperture and the service opening of the second aperture. The longitudinal groove and the service opening of the first aperture may be separated by a first wall portion of the receiving cup and the longitudinal groove and the service opening of the second aperture may be separated by a second wall portion of the receiving cup. The longitudinal groove may be arranged on the side of the outside surface of the receiving cup facing the fuel rail and below the fuel rail.

In another aspect, the receiving cup comprises a clip receptacle on its outside surface to accommodate a clip that secures the first connecting pin in the first aperture and the second connecting pin in the second aperture. The clip defines a C shape comprising: a central clip portion, a first wing portion on a first end of the central clip portion extending away from the central clip portion, a first hook portion at the end of the first wing portion, which end is facing away from the central clip portion, a second wing portion on a second end of the central clip portion extending away from the central clip portion and the first wing portion, and a second hook portion at the end of the second wing portion, which end is facing away from the central clip portion, and wherein the first hook portion and the second hook portion are pointing towards each other. The clip receptacle comprises: a central groove extending between the insertion end of the first aperture and the insertion end of the second aperture, the central clip portion being arranged in the central groove; a first extension groove extending around the outside surface of the receiving cup beyond, and away from, the insertion end of the first aperture, the first wing portion being arranged in the first extension groove, the first extension groove having a first hook hole extending from the bottom of the first extension groove into the receiving cup, the first hook hole being arranged at the end of the first extension groove between the insertion end of the first aperture and the service opening of the first aperture, wherein the first hook portion is arranged in the first hook hole of the first extension groove; and a second extension groove extending around the outside surface of the receiving cup beyond, and away from, the insertion end of the second aperture, the second wing portion being arranged in the second extension groove, the second extension groove having a second hook hole extending from the bottom of the second extension groove into the receiving cup, the second hook hole being arranged at the end of the second extension groove between the insertion end of the second aperture and the service opening of the second aperture, and wherein the second hook portion is arranged in the second hook hole of the second extension groove.

In another aspect, the first hook portion and the second hook portion are bent towards the central clip portion so that a longitudinal axis of first hook portion and a longitudinal axis of the second hook portion define an obtuse angle $\alpha$, and wherein a longitudinal axis of the first hook hole of the first extension groove and a longitudinal axis of the second hook hole of the second extension groove define the same obtuse angle $\alpha$ as the first hook portion and second hook portion.

In another aspect, the clip receptacle extends between more than 180° and less than 270° around the outer circumference of the receiving cup. This requires the clip to be bent open less when mounting it compared to clips extending over 360° while surrounding more than 180° and therefore provide a stronger connection than clips extending over 180°.

In another aspect, the cross section of the first extension groove and the cross section of the second extension groove define a circle segment with a radius r, wherein the clip has a circular cross section with a clip diameter, and wherein radius $r < \text{clip diameter} < 2*r$.

In another aspect, the central groove has a cross section which is wider than the cross section of the first extension groove and the cross section of the second extension groove.

In another aspect, one or more of the group comprising the central groove and the central clip portion are straight.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
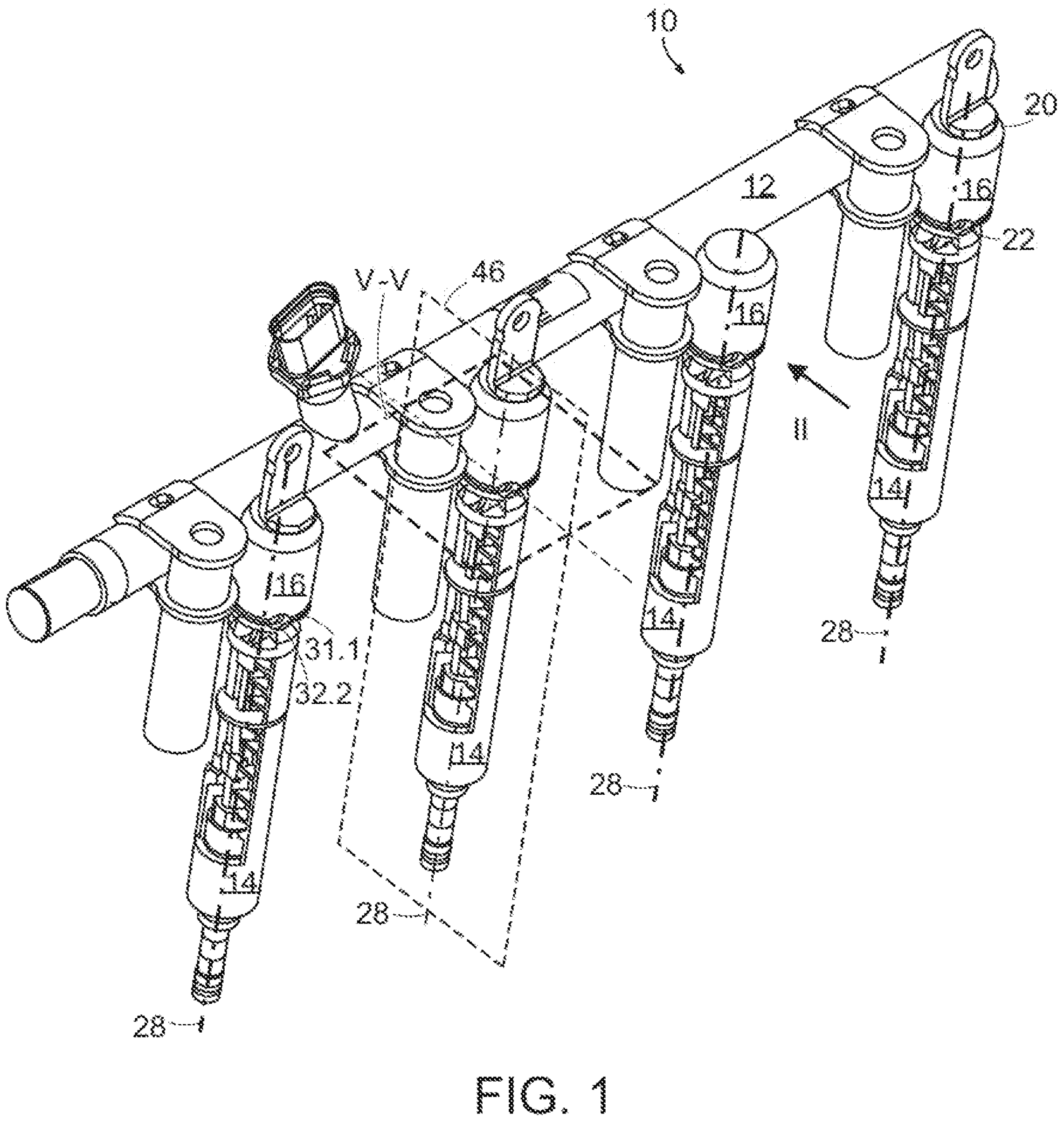
FIG. 1 depicts a fuel rail with several fuel injectors connected to it with receiving cups.
Figure 2:
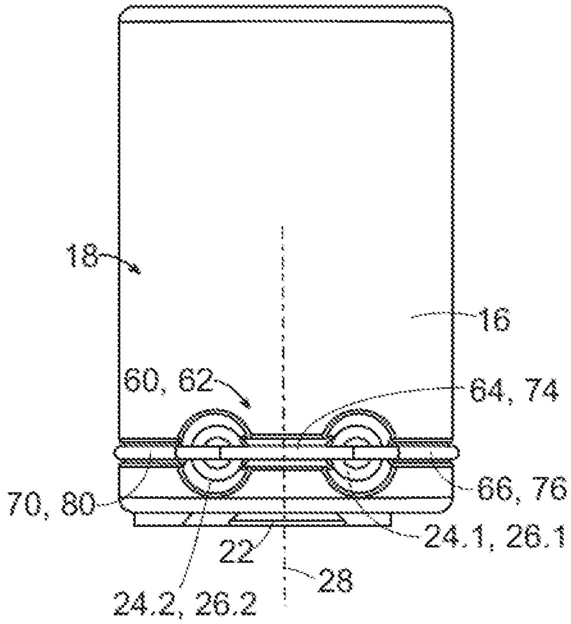
FIG. 2 depicts a front view of a lower part of a receiving cup according to arrow II in FIG. 1.

FIG. 1 depicts a perspective view of a fuel injection system 10 comprising a fuel rail 12 and several fuel injectors 14. Each fuel injector 14 is connected to the fuel rail 12 with a receiving cup 16.

FIGS. 2, 3, 4, and 5 depict in more detail a fuel injector retention arrangement 18 for connecting the fuel injectors 14 with the fuel rail 12. The fuel injector retention arrangement 18 comprises receiving cups 16 for receiving the fuel injectors 14. Each receiving cup 16 has a fuel rail end 20 in connection with the fuel rail 12 and an injector insertion end 22 into which a fuel injector 14 is insertable. The fuel injector retention arrangement 18 further comprises at least a first connecting pin 24.1. When the fuel injector 14 is inserted into the receiving cup 16 the first connecting pin 24.1 secures the fuel injector 14 in the receiving cup 16 and prevents the fuel injector 14 from moving out. The first connecting pin 24.1 is insertable into the receiving cup 16 in such a manner, that a longitudinal axis 26.1 of the first connecting pin 24.1 is situated substantially in a first plane which coincides with line V-V in FIG. 3. The longitudinal axis 26.1 may deviate from the first plane V-V by 2 millimeter and/or 5°. Therefore, the first plane, which is also indicated in FIG. 1, is designated V-V. The first plane V-V is oriented perpendicularly to a longitudinal axis 28 of the receiving cup 16. The first plane V-V may deviate from such a perpendicular angle by 5°. The longitudinal axis 28 is also the longitudinal axis 28 of the fuel injector 14. The first connecting pin 24.1 is at least partially arranged in a first aperture 30.1 of the receiving cup 16, wherein a longitudinal axis 26.1 of the first connecting pin 24.1 is also the longitudinal axis 26.1. Hence, the first longitudinal axis 26.1 of the first aperture 30.1 and the first connecting pin 24.1 are coaxial to each other. The first aperture 30.1 has an insertion end 32.1 into which the first connecting pin 24.1 is insertable and a shoulder 34.1 fonning an axial stop for the first connecting pin 24.1 at a second end 35.1 of the first aperture 30.1 away from the insertion end 32.1 of the first aperture 30.1.

The first aperture 30.1 has a service opening 36.1 which is arranged in the receiving cup 16 between the shoulder 34.1 of the first aperture 30.1 and an outside surface of the receiving cup 16. The service opening 36.1 of the first aperture 30.1 is defined by, or limited by, a first side surface 38.1 radially extending away from the second end 35.1 of the first aperture 30.1 and the longitudinal axis 28 of the receiving cup 16, a second side surface 40.1 extending along the longitudinal axis 26.1 of the first aperture 30.1 and away from the first aperture 30.1, a third side surface 42.1 and a fourth side surface 44.1. The third side surface 42.1 is closer to the fuel rail end 20 of the receive cup 16 and the fourth side surface 44.1 is closer to the injector insertion end 22 of the receiving cup 16. The first side surface 38.1 and second side surface 40.1 are extend between the third side surface 42.1 and fourth side surface 44.1. The second side surface 40.1, the third side surface 42.1 and the fourth side surface 44.1 of the service opening 36.1 of the first aperture 30.1 define a U shape extending along the longitudinal axis 26.1 which opens to the outside surface of the receiving cup 16.

The first side surface 38.1 of the service opening 36.1 of the first aperture 30.1 is arranged at a right angle to the first plane V-V. The first side surface 28.1 extends from the first aperture 30.1 to the outside surface of the receiving cup 16. The first side surface 28.1 may extend from the first aperture 30.1 to the outside surface of the receiving cup 16 defining a plane. The first side surface 38.1 and the second side surface 40.1 of the service opening 36.1 of the first aperture 30.1 are arranged at a right angle to each other. The third side surface 42.1 and the fourth side surface 44.1 of the service opening 36.1 of the first aperture 30.1 are flat, parallel to each other and equidistant to the first plane V-V. The second side surface 40.1 and the third side surface 42.1 of the service opening 36.1 of the first aperture 30.1 define a rounded corner. The second side surface 40.1 and the fourth side surface 44.1 of the service opening 36.1 of the first aperture 30.1 also define a rounded corner. In the depicted example the rounded corners have a corner radius which is less than half the distance between the third side surface 42.1 and the fourth side surface 44.1. That corner radius may also be half the distance between the third side surface 42.1 and the fourth side surface 44.1 in which case the entire second side surface 40.1 is curved along the longitudinal axis 26.1.

The fuel injector retention arrangement 18 further comprises a second connecting pin 24.2. When the fuel injector 14 is inserted into the receiving cup 16 the second connecting pin 24.2 secures the fuel injector 14 in the receiving cup 16 and prevents the fuel injector 14 from moving out. The second connecting pin 24.2 is insertable into the receiving cup 16 in such a manner, that a longitudinal axis 26.2 of the second connecting pin 24.2 is situated substantially in the first plane V-V. The longitudinal axis 26.2 may deviate from the first plane V-V by 2 millimeter and/or 5°. The second connecting pin 24.2 is at least partially arranged in a second aperture 30.2 of the receiving cup 16, wherein a longitudinal axis 26.2 of the second aperture 30.2 and the longitudinal axis 26.2 of the second connecting pin 24.2 are coaxial to each other. The second aperture 30.2 has an insertion end 32.2 into which the second connecting pin 24.2 is insertable and a shoulder 34.2 forming an axial stop for the second connecting pin 24.2 at a second end 35.2 of the second aperture 30.2 away from the insertion end 32.2 of the second aperture 30.2.

The second aperture 30.2 also has a service opening 36.2 which is arranged in the receiving cup 16 between a shoulder 34.2 of the second aperture 30.2 and an outside surface of the receiving cup 16. The service opening 36.2 of the second aperture 30.2 is defined by, or limited by, a first side surface 38.2 radially extending away from the second aperture 30.2 and the longitudinal axis 28 of the receiving cup 16, a second side surface 40.2 extending along the longitudinal axis 26.2 of the second aperture 30.2 and away from the second aperture 30.2, a third side surface 42.2 and a fourth side surface 44.2. The third side surface 42.2 is closer to the fuel rail end 20 of the receive cup 16 and the fourth side surface 44.2 is closer to the injector insertion end 22 of the receiving cup 16. The third side surface 42.2 is closer to the fuel rail end 20 of the receive cup 16 and the fourth side surface 44.2 is closer to the injector insertion end 22 of the receiving cup 16. The first side surface 38.2 and the second side surface 40.2 extend between the third side surface 42.2 and fourth side surface 44.2. The service opening 36.1 of the first aperture 30.1 and the service opening 36.2 of the second aperture 30.2 have the same distance to the longitudinal axis 28 of the receiving cup 16.

The first side surface 38.2 of the service opening 36.2 of the second aperture 30.2 is arranged at a right angle to the first plane V-V. The first side surface 28.2 extends from the second aperture 30.2 to the outside surface of the receiving cup 16. The first side surface 28.1 may extend from the first aperture 30.1 to the outside surface of the receiving cup 16 defining a plane. The first side surface 38.2 and the second side surface 40.2 of the service opening 36.2 of the second aperture 30.2 are arranged at a right angle to each other. The third side surface 42.2 and the fourth side surface 44.2 of the service opening 36.2 of the second aperture 30.2 are flat, parallel to each other and equidistant to the first plane V-V. The second side surface 40.2 and the third side surface 42.2 of the service opening 36.2 of the second aperture 30.2 define a rounded corner. The second side surface 40.2 and the fourth side surface 44.2 of the service opening 36.2 of the second aperture 30.2 also define a rounded corner. In the depicted example the rounded corners have a corner radius which is less than half the distance between the third side surface 42.2 and the fourth side surface 44.2. That corner radius may also be half the distance between the third side surface 42.2 and the fourth side surface 44.2 in which case the entire second side surface 40.2 is curved along the longitudinal axis 26.2. The second side surface 40.2, the third side surface 42.2 and the fourth side surface 44.2 of the service opening 36.2 of the second aperture 30.2 define a U shape extending along the longitudinal axis 26.2 which opens to the outside surface of the receiving cup 16.

The longitudinal axis 28 of the receiving cup 16 defines a symmetry plane 46. The first aperture 30.1 and the second aperture 30.2 are symmetrically arranged to each other with respect to the symmetry plane 46. The service opening 36.1 of the first aperture 30.1 and the service opening 36.2 of the second aperture 30.2 are symmetrically arranged to each other with respect to the symmetry plane 46. The first side surface 38.1 of the service opening 36.1 of the first aperture 30.1 and the first side surface 38.2 of the service opening 36.2 of the second aperture 30.2 define a service opening plane 48 which is parallel to the longitudinal axis 28 of the receiving cup 16 and at a right angle to the first plane V-V.

Figure 3:
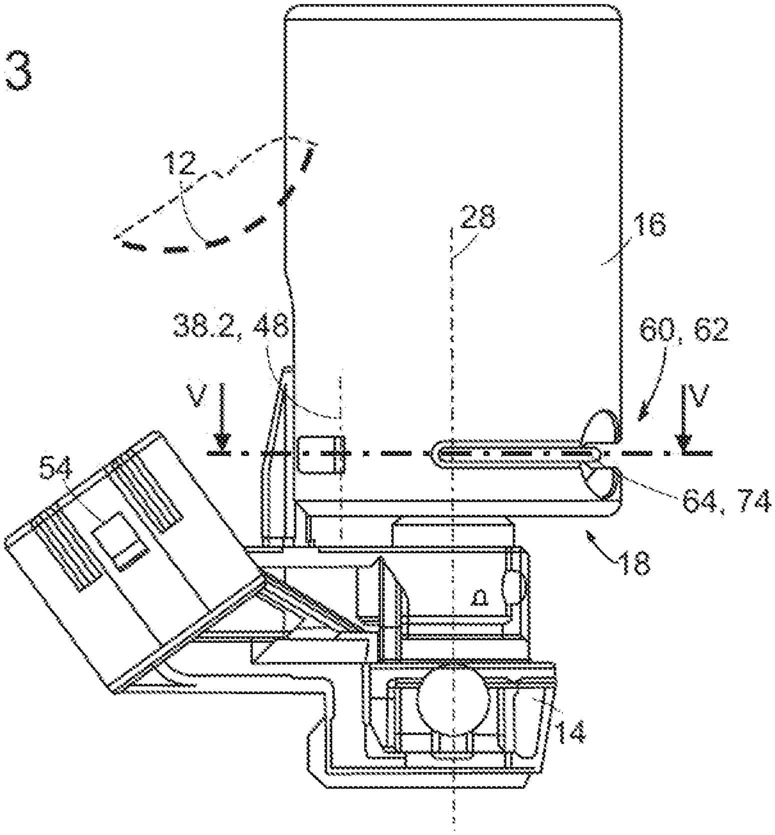
FIG. 3 depicts a side view from the left of the receiving cup FIG. 2 with a part of the cross section of the fuel rail shown in a simplified form.
Figure 4:
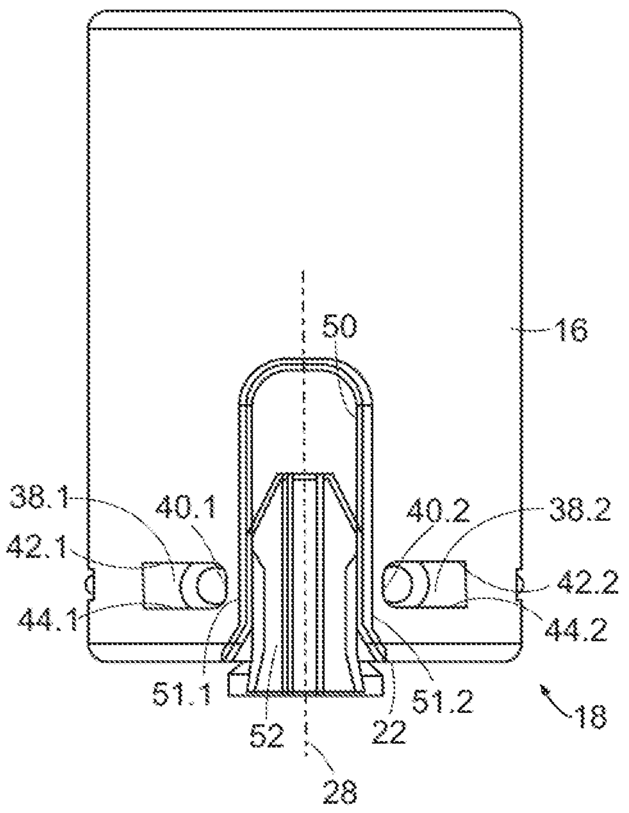
FIG. 4 depicts a rear view of receiving cup in FIG. 2.
Figure 5:
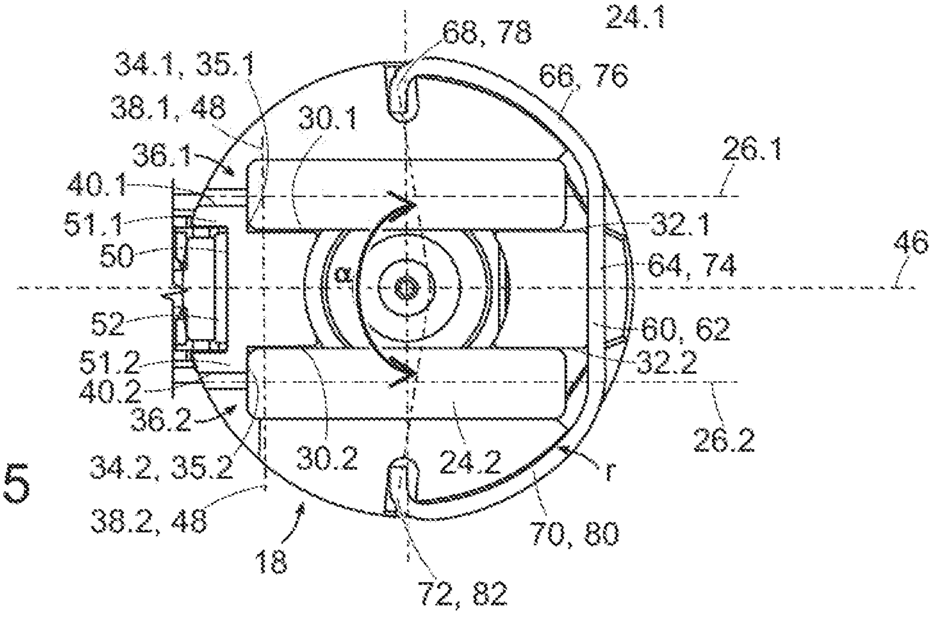
FIG. 5 depicts a cross section according to line V-V of FIG. 3.

The receiving cup 16 comprises a longitudinal groove 50 which extends around and along the outside surface or outer circumference of the receiving cup 16 and between the service opening 36.1 of the first aperture 30.1 and the service opening 36.2 of the second aperture 30.2. The longitudinal groove 50 and the service opening 36.1 of the first aperture 30.1 are separated by a first wall portion 51.1 of the receiving cup 16. The first wall portion 51.1 is located between the second side surface 40.1 of the service opening 36.1 of the first aperture 30.1 and the longitudinal groove 50. The longitudinal groove 50 and the service opening 36.2 of the second aperture 30.2 are separated by a second wall portion 51.2 of the receiving cup 16. The second wall portion 51.2 is located between the second side surface 40.2 of the service opening 36.2 of the second aperture 30.2 and the longitudinal groove 50. The longitudinal groove 50 is arranged on the side of the outside surface of the receiving cup 16 facing the fuel rail 12 and below the fuel rail 12. The longitudinal groove 50 receives an axial extension 52 of the fuel injector 14 which is arranged between the longitudinal axis 28 and an electrical connector 54 of the fuel injector 14 (FIG. 3).

The first and second apertures 30.1, 30.2 may be drilled. To drill the first and second apertures 30.1, 30.2 one drill or a pair of drills is pushed along longitudinal axes 26.1, 26.2 to form the first and second apertures 30.1, 30.2. The first and second apertures 30.1, 30.2 are drilled with a drill that has a bottom that is flat or has an obtuse angle. The first and second apertures 30.1, 30.2 may also be laser cut. The first and second apertures 30.1, 30.2 may also be readily incorporated in a receiving cup 16 if it is cast.

The first and second service openings 36.1, 36.2 may be milled. For this, an end mill may be moved along the plane 48 from the outside of the receiving cup 16 towards the longitudinal groove 50 or symmetry plane 46. The position of the plane 48 is such that the first and second apertures 30.1, 30.2 are open on their second end but the shoulders 34.1, 34.2 remain. The first and second service openings 36.1, 36.2 may also be laser cut or incorporated in the receiving cup 16 if it is a cast part.

Due to the design of the service openings 36.1, 36.2 described above the first and second wall portions 51.1, 51.2 may be thicker than if the service openings 36.1, 36.2 were stepped bores. The second side surfaces 40.1, 40.2 can be a further away from the longitudinal groove 50 there by allowing the wall portions 51.1, 51.2 being thicker. The resulting cross sections of the apertures 30.1, 30.2 at the locations of the first and second shoulders 34.1, 34.2 are larger which enables the use of tools with a bigger cross section to push out the first and second connecting pins 24.1, 24.2 so the fuel injector 14 can be removed from the receiving cup 16 when the fuel injection system 10 needs to be maintained or repaired.

The receiving cup 16 further comprises a clip receptacle 60 on its outside surface to accommodate a clip 62 that secures the first connecting pin 24.1 in the first aperture 30.1 and the second connecting pin 24.2 in the second aperture 30.2. The clip 62 defines a C shape comprising a central clip portion 64, a first wing portion 66 on a first end of the central clip portion 64 extending away from the central clip portion 64, a first hook portion 68 at the end of the first wing portion 66, which end is facing away from the central clip portion 64, a second wing portion 70 on a second end of the central clip portion 64 extending away from the central clip portion 64 and the first wing portion 66, a second hook portion 72 at the end of the second wing portion 70, which end is facing away from the central clip portion 64. The first hook portion 68 and the second hook portion 72 are pointing towards each other.

The clip receptacle 60 comprises a central groove 74 extending between the insertion end 32.1 of the first aperture 30.1 and the insertion end 32.2 of the second aperture 30.2. The central clip portion 64 is arranged in the central groove 74. The clip receptacle 60 further comprises a first extension groove 76 beginning at the insertion end 32.1 of the first aperture 30.1 and extending away from the insertion end 32.1. The first extension groove 76 extends around a part of the outside surface of the receiving cup 16. The first extension groove 76 extends beyond the insertion end 32.1 and between the insertion end 32.1 and the service opening 36.1 In the example shown in the figures the first extension groove 76 does not extend all the way to the service opening 36.1. The first extension groove 76 may extend all the way to the service opening 36.1. The first wing portion 66 is arranged in the first extension groove 76. The first extension groove 76 has a first hook hole 78 of the receiving cup 16 which first hook hole 78 extends from the bottom of the first extension groove 76 into the receiving cup 16. The first hook hole 78 is arranged at the end of the first extension groove 76 between the insertion end 32.1 of the first aperture 30.1 and the service opening 36.1 of the first aperture 30.1. The first hook portion 68 is arranged in the first hook hole 78 of the first extension groove 76. The clip receptacle 60 further comprises a second extension groove 80 beginning at the insertion end 32.2 of the second aperture 30.2 and extending away from the insertion end 32.2. The second extension groove 80 extends around a part of the outside surface of the receiving cup 16. The second extension groove 80 extends beyond the insertion end 32.2 and between the insertion end 32.2 and the service opening 36.2. In the example shown in the figures the second extension groove 80 does not extend all the way to the service opening 36.2. The second extension groove 80 may extend all the way to the service opening 36.1. Both the first extension groove 76 and the second extension groove 80 may extend around the entire circumference of the receiving cup 16. The second wing portion 70 is arranged in the second extension groove 80. The second extension groove 80 has a second hook hole 82 of the receiving cup 16 extending from the bottom of the second extension groove 80 into the receiving cup 16. The second hook hole 82 is arranged at the end of the second extension groove 80 between the insertion end 32.2 of the second aperture 30.2 and the service opening 36.2 of the second aperture 30.2. The second hook portion 72 is arranged in the second hook hole 82 of the second extension groove 80.

The first wing portion 66 and the second wing portion 70 are curved with a radius that is slightly smaller than the radius of the first extension groove 76 and the second extension groove 80. The biggest width defined by the first wing portion 66 and the second wing portion 70 is smaller than the biggest width defined by the first extension groove 76 and the second extension groove 80. Either one measure or both combined ensure a snug fit of the clip 62 in the clip receptacle 60.

The first hook portion 68 and the second hook portion 72 are bent towards the central clip portion 64 so that a longitudinal axis of the first hook portion 68 and a longitudinal axis of the second hook portion 72 define an obtuse angle $\alpha$. A longitudinal axis of the first hook hole 78 of the first extension groove 76 and a longitudinal axis of the second hook hole 82 of the second extension groove 80 define the same obtuse angle $\alpha$ as the first hook portion 68 and second hook portion 72. The longitudinal axis of the first hook hole 78 of the first extension groove 76 and a longitudinal axis of the second hook hole 82 of the second extension groove 80 may define an angle α which is different from the obtuse angle α of the longitudinal axes of the first hook portion 68 and the second hook portion 72. The obtuse angle α of the longitudinal axes is more than 180° and less than 200°. The clip receptacle 60 extends hence over an angle α of more than 180° and less than 200° around the outer circumference of the receiving cup 16 but may extend between more than 180° and less than 270° around the outer circumference of the receiving cup 16.

The cross section of the first extension groove 76 and the cross section of the second extension groove 80 define a circle segment with a radius r. The cross section of the first extension groove 76 and the second extension groove 80 may define a semicircle. The clip 62 has a circular cross section with a clip diameter, wherein the radius r<clip diameter<2*r. The central groove 74 has a cross section which is wider than the cross section of the first extension groove 76 and the cross section of the second extension groove 80. The central groove 74 has a cross section which is deeper than the cross section of the first extension groove 76 and the second extension groove 80. One or more of the group comprising the central groove 74 and the central clip portion 64 are straight. But they may also be curved.

While exemplary embodiments are described above, it is not intended that these embodiments describe all possible forms of the disclosed fuel injector retention arrangement 18. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A fuel injector retention arrangement for connecting a fuel injector with a fuel rail comprising:

a receiving cup for the fuel injector, the receiving cup having a fuel rail end in connection with the fuel rail and a fuel injector insertion end into which the fuel injector is insertable;

at least a first connecting pin, the first connecting pin being insertable into the receiving cup in such a manner, that a longitudinal axis of the first connecting pin is situated at least substantially in a first plane, which is oriented perpendicularly to a longitudinal axis of the receiving cup;

wherein the first connecting pin is at least partially arranged in a first aperture defined by the receiving cup, wherein a longitudinal axis of the first aperture and the longitudinal axis of the first connecting pin are coaxial to each other;

wherein the first aperture has an insertion end into which the first connecting pin is insertable and a shoulder forming an axial stop for the first connecting pin at a second end of the first aperture away from the insertion end of the first aperture;

wherein the first aperture has a service opening which is arranged in the receiving cup between the shoulder of the first aperture and an outside surface of the receiving cup; and wherein the service opening of the first aperture is defined by:

a first side surface radially extending away from the second end of the first aperture and the longitudinal axis of the first aperture, a second side surface extending along the longitudinal axis of the first aperture and away from the first aperture, and a third side surface and a fourth side surface, wherein the first side surface and the second side surface extend between the third side surface and fourth side surface.

2. The fuel injector retention arrangement according to claim 1, wherein the first side surface of the service opening of the first aperture is arranged at a right angle to the first plane and extends from the first aperture to the outside surface of the receiving cup.

3. The fuel injector retention arrangement according to claim 1, wherein the first side surface and the second side surface of the service opening of the first aperture are arranged at a right angle to each other.

4. The fuel injector retention arrangement according to claim 1, wherein the third side surface and the fourth side surface of the service opening of the first aperture are flat, parallel to each other and equidistant to the first plane.

5. The fuel injector retention arrangement according to claim 1, wherein the second side surface and the third side surface of the service opening of the first aperture define a rounded corner and wherein the second side surface and the fourth side surface of the service opening of the first aperture define a rounded corner.

6. The fuel injector retention arrangement according to claim 1, comprising:

a second connecting pin, the second connecting pin being insertable into the receiving cup in such a manner, that a longitudinal axis of the second connecting pin is situated at least substantially in the first plane;

wherein the second connecting pin is at least partially arranged in a second aperture defined by the receiving cup, wherein a longitudinal axis of the second aperture and the longitudinal axis of the second connecting pin are coaxial to each other;

wherein the second aperture has an insertion end into which the second connecting pin is insertable and a shoulder forming an axial stop for the second connecting pin at a second end of the second aperture away from the insertion end of the second aperture;

wherein the second aperture has a service opening which is arranged in the receiving cup between a shoulder of the second aperture and an outside surface of the receiving cup; and wherein the service opening of the second aperture comprises:

a first side surface radially extending away from the second aperture and the longitudinal axis of the receiving cup, a second side surface extending along the longitudinal axis of the first aperture and away from the second aperture, a third side surface and a fourth side surface, wherein the first side surface and the second side surface extend between the third side surface and fourth side surface, and wherein the service opening of the first aperture and the service opening of the second aperture have the same distance to the longitudinal axis of the receiving cup.

7. The fuel injector retention arrangement according to claim 6, wherein the first side surface of the service opening of the second aperture is arranged at a right angle to the first plane and extends from the second aperture to the outside surface of the receiving cup.

8. The fuel injector retention arrangement according to claim 6, wherein the first side surface and the second side surface of the service opening of the second aperture are arranged at a right angle to each other.

9. The fuel injector retention arrangement according to claim 6, wherein the third side surface and the fourth side surface of the service opening of the second aperture are flat, parallel to each other and equidistant to the first plane.

10. The fuel injector retention arrangement according to claim 6, wherein the second side surface and the third side surface of the service opening of the second aperture define a rounded corner and wherein the second side surface and the fourth side surface of the service opening of the second aperture define a rounded corner.

11. The fuel injector retention arrangement according to claim 6, wherein the longitudinal axis of the receiving cup defines a symmetry plane, wherein the first aperture and second aperture are symmetrically arranged to each other with respect to the symmetry plane, and wherein the service opening of the first aperture and the service opening of the second aperture are symmetrically arranged to each other with respect to the symmetry plane.

12. The fuel injector retention arrangement according to claim 6, wherein the first side surface of the service opening of the first aperture and the first side surface of the service opening of the second aperture define a service opening plane which is parallel to the longitudinal axis of the receiving cup and at a right angle to the first plane.

13. The fuel injector retention arrangement according to claim 6, wherein the receiving cup comprises a longitudinal groove which extends along the outside surface of the receiving cup and between the service opening of the first aperture and the service opening of the second aperture, wherein the longitudinal groove and the service opening of the first aperture are separated by a first wall portion of the receiving cup, and wherein the longitudinal groove and the service opening of the second aperture are separated by a second wall portion of the receiving cup.

14. The fuel injector retention arrangement according to claim 13, wherein the longitudinal groove is arranged on a side of the outside surface of the receiving cup facing the fuel rail and below the fuel rail.

15. The fuel injector retention arrangement according to claim 6, wherein the receiving cup comprises a clip receptacle on its outside surface to accommodate a clip that secures the first connecting pin in the first aperture and the second connecting pin in the second aperture:

wherein the clip defines a C shape comprising:

a central clip portion, a first wing portion on a first end of the central clip portion extending away from the central clip portion, a first hook portion at an end of the first wing portion, which end is facing away from the central clip portion, a second wing portion on a second end of the central clip portion extending away from the central clip portion and the first wing portion, a second hook portion at the end of the second wing portion, which end is facing away from the central clip portion, wherein the first hook portion and the second hook portion are pointing towards each other; and wherein the clip receptacle comprises:

a central groove extending between the insertion end of the first aperture and the insertion end of the second aperture, the central clip portion being arranged in the central groove, a first extension groove extending around the outside surface of the receiving cup beyond, and away from, the insertion end of the first aperture, the first wing portion being arranged in the first extension groove, the first extension groove having a first hook hole extending from a bottom of the first extension groove into the receiving cup, the first hook hole being arranged at the end of the first extension groove between the insertion end of the first aperture and the service opening of the first aperture, wherein the first hook portion is arranged in the first hook hole of the first extension groove, and a second extension groove extending around the outside surface of the receiving cup beyond, and away from, the insertion end of the second aperture, the second wing portion being arranged in the second extension groove, the second extension groove having a second hook hole extending from the bottom of the second extension groove into the receiving cup, the second hook hole being arranged at the end of the second extension groove between the insertion end of the second aperture and the service opening of the second aperture, wherein the second hook portion is arranged in the second hook hole of the second extension groove.

16. The fuel injector retention arrangement according to claim 15, wherein the first hook portion and the second hook portion are bent towards the central clip portion so that a longitudinal axis of first hook portion and a longitudinal axis of the second hook portion define an obtuse angle $\alpha$, and wherein a longitudinal axis of the first hook hole of the first extension groove and a longitudinal axis of the second hook hole of the second extension groove define the same obtuse angle $\alpha$ as the first hook portion and second hook portion.

17. The fuel injector retention arrangement according to claim 15, wherein the clip receptacle extends between more than 180° and less than 270° around an outer circumference of the receiving cup.

18. The fuel injector retention arrangement according to claim 15, wherein a cross section of the first extension groove and a cross section of the second extension groove define a circle segment with a radius r, wherein the clip has a circular cross section with a clip diameter, and wherein radius $r < \text{clip diameter} < 2*r$.

19. The fuel injector retention arrangement according to claim 15, wherein the central groove has a cross section which is wider than the cross section of the first extension groove and the cross section of the second extension groove.

20. The fuel injector retention arrangement according to claim 15, wherein one or more of the group comprising the central groove and the central clip portion are straight.

* * * * *